United States Patent
Takahashi (10) Patent No.: US 9,796,426 B2
(45) Date of Patent: Oct. 24, 2017

(54) COWL STRUCTURE

(71) Applicant: HONDA MOTOR CO., LTD., Tokyo (JP)

(72) Inventor: Koji Takahashi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/035,841

(22) PCT Filed: Nov. 7, 2014

(86) PCT No.: PCT/JP2014/079608
§ 371 (c)(1),
(2) Date: Jun. 16, 2016

(87) PCT Pub. No.: WO2015/068814
PCT Pub. Date: May 14, 2015

(65) Prior Publication Data
US 2016/0280275 A1    Sep. 29, 2016

(30) Foreign Application Priority Data

Nov. 11, 2013  (JP) .................................. 2013-233083

(51) Int. Cl.
*B62D 25/00*         (2006.01)
*B62D 25/08*         (2006.01)
(Continued)

(52) U.S. Cl.
CPC .............. *B62D 25/081* (2013.01); *B60J 1/02* (2013.01); *B60J 10/70* (2016.02); *B62D 25/14* (2013.01)

(58) Field of Classification Search
CPC ........ B62D 25/081; B62D 25/14; B60J 10/70; B60J 1/02
(Continued)

(56) References Cited

U.S. PATENT DOCUMENTS 4,750,780 A    6/1988  Harasaki et al.
8,152,227 B2*  4/2012  Kurata .................... B60R 13/04
                                                      296/192
(Continued)

FOREIGN PATENT DOCUMENTS

CN    101638111    2/2010
CN    101786472    7/2010
(Continued)

OTHER PUBLICATIONS

International Search Report, dated Dec. 22, 2014 (Dec. 22, 2014).
(Continued)

*Primary Examiner* — Joseph D Pape
(74) *Attorney, Agent, or Firm* — Rankin, Hill & Clark LLP (57) ABSTRACT

An outer glass contact section, which is parallel to and comes into close contact with the outer surface of a windscreen, and inner glass contact parts, which have lips that press the inner surface of the windscreen, are formed at the vehicle rear-side edge of a cowl body. The lips each have a folded shape or a curved shape, have a folding point for the folded shape or a curving point for the curved shape as a boundary, and include a base-side first lip section and a distal-side second lip section.

8 Claims, 8 Drawing Sheets

(51) Int. Cl.
*B60J 10/70* (2016.01)
*B60J 1/02* (2006.01)
*B62D 25/14* (2006.01)

(58) Field of Classification Search
USPC .......................................... 296/192
See application file for complete search history.

(56) References Cited

U.S. PATENT DOCUMENTS

| | | | |
|---|---|---|---|
| 8,641,130 B2* | 2/2014 | Morden | B62D 25/081 296/187.04 |
| 2010/0187862 A1 | 7/2010 | Kurata et al. | |
| 2011/0049933 A1 | 3/2011 | Serizawa et al. | |

FOREIGN PATENT DOCUMENTS

| | | |
|---|---|---|
| JP | 61-249875 | 11/1986 |
| JP | 2003-127661 A | 5/2003 |
| JP | 2007-223434 | 9/2007 |
| JP | 2009-023657 A | 2/2009 |
| JP | 2009-262763 | 11/2009 |
| JP | 2011-084130 | 4/2011 |

OTHER PUBLICATIONS

Japanese Office Action dated Dec. 20, 2016, 2 pages.
Chinese Office Action dated Apr. 6, 2017, 7 pages.

\* cited by examiner

COWL STRUCTURE

TECHNICAL FIELD

The present invention relates to a cowl structure that supports a lower end of a windshield glass.

BACKGROUND ART

In some wheeled vehicles, a windshield glass is supported by a cowl that is positioned on an upper portion of a dashboard panel at a lower end thereof. Patent Literature 1 discloses a prior art technique in relation to a windshield glass supporting structure using a cowl.

As shown in FIG. 7 of Patent Literature 1, a substantially recess-shaped windshield inserting portion is formed on a rear edge of a cowl main body. When a windshield glass is inserted into this inserting portion, an inner surface of the windshield glass is pressed towards an outer surface of the windshield glass by a lip, and the outer surface of the windshield glass is brought into close contact with an outer glass contact portion. This allows the lower end of the windshield glass to be supported in such a way as to be held therein.

A cowl main body like the one described above can be formed through resin molding in which a resin is poured into a mold. In molding a cowl main body, there occurs a case where a boundary between a plurality of molds coincides with a portion corresponding to a tip or distal end of a lip. It is inevitable that part of molten resin oozes out of the boundary of the molds. A boundary portion of the molds is molded continuously, and therefore, the resin that has oozed out is formed rectilinearly on the distal end of the lip. The line formed of the resin that has oozed out of the boundary portion of the molds is called a parting line. The parting line is thinner than the other portions of the cowl main body molded, and therefore, there occurs a case where the parting line sets more quickly than the other portions, as a result of which the hardness of the parting line becomes higher than that of the other portions. It is desirable that the windshield glass is restrained from being pressed by the highly hard portion.

Here, it is considered that a cushion material is disposed between the parting line and the windshield glass to restrain the windshield glass from being pressed by the parting line. However, disposing the cushion material increases the number of parts involved. It is required to improve this point.

PRIOR ART LITERATURE

Patent Literature

Patent Literature 1
JP-2007-223434-A

SUMMARY OF THE INVENTION

Problem that the Invention is to Solve

A problem that the invention is to solve is to provide a cowl structure that can restrain a windshield glass from being pressed by a distal end portion of a lip with a small number of parts involved.

Means for Solving the Problem

According to the invention, there is provided a cowl structure including:

a long cowl main body that is connected to an upper portion of a dashboard panel making up a front wall of a passenger compartment of a wheeled vehicle, and that is continuous with a lower end of a windshield glass,
  wherein the cowl main body has, at a rear edge thereof,
    an outer glass contact portion that is disposed parallel to an outer surface of the windshield glass, and that is brought into close contact with the windshield glass, and
    an inner glass contact portion that has a lip that presses an inner surface of the windshield glass,
  wherein the lip is formed at a distal end of the inner glass contact portion, has a bent shape or a curved shape that protrudes upwards, and is made up of a proximal-side first lip portion and a distal-side second lip portion with a bending point of the bent shape or a curving point of the curved shape as a boundary portion, and
  wherein the second lip portion extends from the boundary portion towards a distal end while moving away from the windshield glass with respect to the first lip portion.

It is preferable that, in a state where the windshield glass is inserted between the outer glass contact portion and the inner glass contact portion, the second lip portion is spaced apart from the windshield glass.

It is preferable that, in an extending direction of the lip, a length of the first lip portion is longer than a length of the second lip portion.

It is preferable that a portion of the outer glass contact portion is made thin.

Advantage of the Invetnion

In the invention, the lip has the bent shape or the curved shape and is made up of the proximal-side first lip portion and the distal-side second lip portion with the bending point of the bent shape or the curving point of the curved shape as the boundary portion. Then, the second lip portion is formed so as to extend from the boundary portion towards the distal end while moving away from the windshield glass with respect to the first lip portion.

When the windshield glass is inserted into the cowl main body having the lip configured in the way described above, the portion of the second lip portion that lies closer to the proximal side than the distal end is brought into contact with the windshield glass. Namely, this enables the windshield glass to be pressed by the lip excluding the distal end portion having the highest hardness. In addition, there is a case where the whole surface of the second lip portion is brought into contact with the windshield glass. As this occurs, although the distal end of the second lip portion is also brought into contact with the windshield glass, not only the distal end but also the other portions of the second lip portion are brought into contact with the windshield glass, and therefore, compared with a case where the windshield glass is pressed only by the distal end, the windshield glass is pressed by the second lip portion softly.

Consequently, the contact of the lip of the invention with the windshield glass to press it is made by the point or the surface that is softer than the distal end. Namely, it is possible to avoid a risk of the windshield glass being pressed by the portion having the high hardness. As this occurs, there is no need to dispose a cushion material along a circumferential edge of the lip or an end portion of the windshield glass, thereby making it possible to prevent the increase in the number of parts involved.

In the invention, with the windshield glass inserted between the glass contact portions, the second lip portion stays spaced apart from the windshield glass. Namely, there is no such situation that the windshield glass is pressed by the distal end of the second lip portion that has the highest hardness. Owing to this, it is possible to avoid the risk of the windshield glass being pressed by the portion having the high hardness in a more ensured fashion.

In the invention, in the extending direction of the lip, the length of the first lip portion is longer than the length of the second lip portion. Namely, the length of the first lip portion is longer than a half the overall length of the lip. In case the length of the first lip portion is too short, almost no deformation is generated in the first lip portion, thereby making it difficult to insert the windshield glass between the glass contact portions. However, in case the specified length described above is ensured for the first lip portion, the first lip portion is deformed greatly when the windshield glass is inserted, thereby making it easy to insert the windshield glass between the glass contact portions. Then, it is possible to obtain an appropriate repulsion after the windshield glass has been inserted by ensuring the specified length described above. As a result, in holding the windshield glass, the easy insertion of the windshield glass can be compatible with the ensuring of the holding force of the windshield glass.

In this invention, a portion of the outer glass contact portion is made thin. This enables the outer glass contact portion to be bent easily from the thin portion acting as a bending initiating point. A distal end of the outer glass contact portion leans on the windshield glass by its own weight, thereby improving the following performance thereof along the outer surface of the windshield glass. This suppresses the generation of clearance or deformation between the windshield glass and the outer glass contact portion and improves the degree of adhesion of the windshield glass to the outer glass contact portion, making it difficult for rain water to intrude therebetween. In addition, the improved degree of adhesion increases the integrity of the windshield glass with the outer glass contact portion, thereby improving the design of the windshield.

MODE FOR CARRYING OUT THE INVENTION

Embodiments of the invention will be described below based on the accompanying drawings. When referred to in the following description, left and right denote left and right based on the position of an occupant sitting in a wheeled vehicle, and front and rear denote front and rear based on a travelling direction of the wheeled vehicle. In the drawings, Fr denotes front and Rr denotes rear. L denotes the left and R denotes the right of the occupant who sits in the wheeled vehicle while facing the front. Up denotes an upward direction, and Dw denotes a downward direction.

<Embodiment 1>

Embodiment 1 of the invention will be described based on the drawings.

Figure 1:
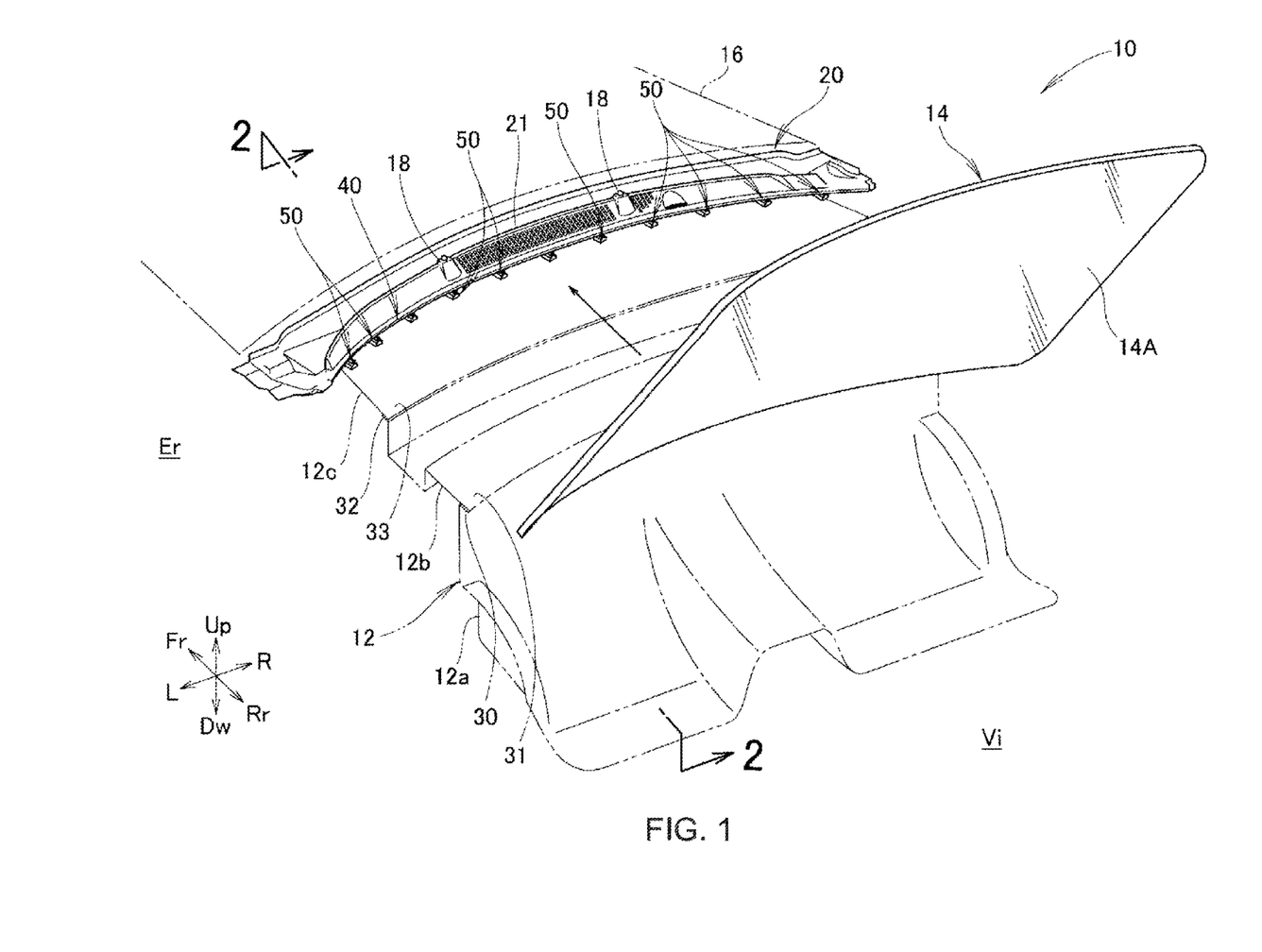
FIG. 1 is an exploded perspective view of a cowl structure according to Embodiment 1 of the invention.

FIG. 1 is referred to. A dashboard panel 12 is provided at a front portion of a wheeled vehicle 10 so as to extend in a vehicle's width direction, and this dashboard panel 12 separates a passenger compartment Vi from an engine compartment Er. A resin cowl main body 20 is connected to an upper portion of the dashboard panel 12 along the vehicle's width direction. A lower end of a windshield glass 14 is supported by the cowl main body 20. A hood 16 is provided in front of the cowl main body 20 so as to open and close the engine compartment Er from above.

The dashboard panel 12 includes a dashboard lower panel 12a that makes up a front wall of the passenger compartment Vi, a dashboard upper panel 12b that is joined to an upper portion of the dashboard lower panel 12a and which extends to the front of the wheeled vehicle and a dashboard lid panel 12c that is joined to an end portion of the dashboard lower panel 12b and which extends to the front of the wheeled vehicle.

The cowl main body 20 is a resin molded part that is formed through injection molding, and a grill portion 21 is formed in the vicinity of a transverse center thereof for induction of outside air. Wind washer nozzles 18, 18 are mounted on left and right sides of the grill portion 21. The wind washer nozzles 18, 18 are members that jet a window washing liquid for washing the windshield glass 14. An outer glass contact portion 40 and inner glass contact portions 50 are formed integrally on a rear edge of the cowl main body 20 so as to hold the lower end of the windshield glass 14 from an outer side and an inner side thereof.

The outer glass contact portion 40 is formed continuously along almost an overall width in a vehicle's width direction, and is brought into contact with an outer surface of the windshield 14. The inner glass contact portions 50 are formed at a plurality of locations in a disconnected fashion, and are brought into contact with an inner surface of the windshield glass 14. In this embodiment, a total of 11 inner glass contact portions 50 are formed on the cowl main body 20. The outer glass contact portion 40 and the inner glass contact portions 50 will be described in detail.

Figure 2:
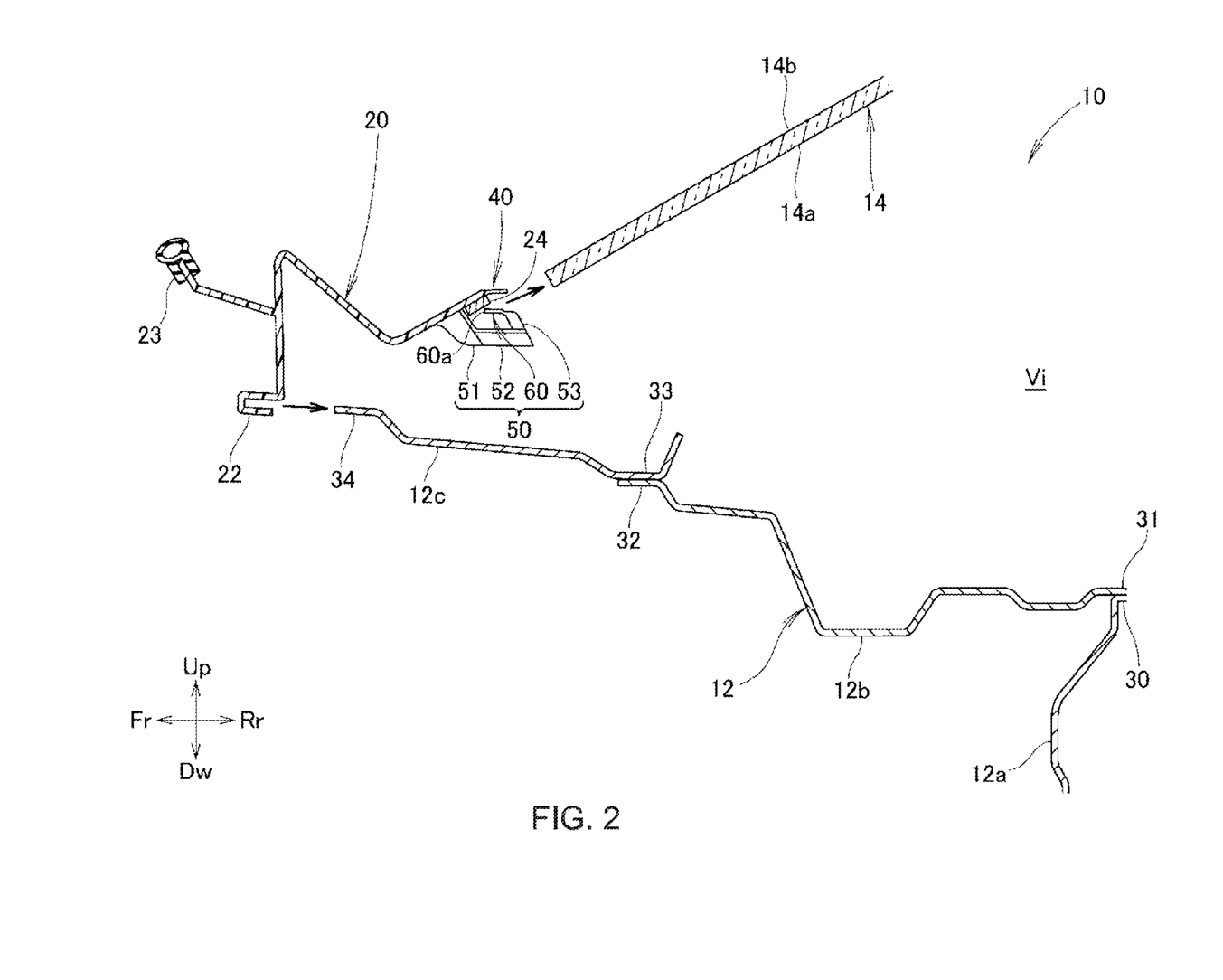
FIG. 2 is a sectional view taken along a line 2-2 in FIG. 1.

FIG. 2 is referred to. The dashboard lower panel 12a and the dashboard upper panel 12b are joined together through spot welding at overlapping flanges 30, 31 that are formed at end portions of the dashboard lower panel 12a and the dashboard upper panel 12b, respectively. Similarly, the dashboard upper panel 12b and the dashboard lid panel 12c are also joined together through spot welding at flanges 32, 33 thereof A recessed inserting portion 22 opened to the rear is formed integrally at a lower portion of the cowl main body 20. The flange 34 of the dashboard lid panel 12c is inserted into this inserting portion 22, and at the same time, the outer glass contact portion 40 and the inner glass contact portion 50 take hold of the lower end of the windshield glass 14, whereby the cowl main body 20 is mounted on the wheeled vehicle 10. A weatherstrip 23 is attached to a front end portion of the cowl main body 20 so as to extend along the overall width in the vehicle's width direction. When the hood (reference numeral 16, in FIG. 1) is closed, the weatherstrip 23 is brought into close contact with the hood (reference numeral 16, in FIG. 1) to prevent the intrusion of rain water.

Figure 3:
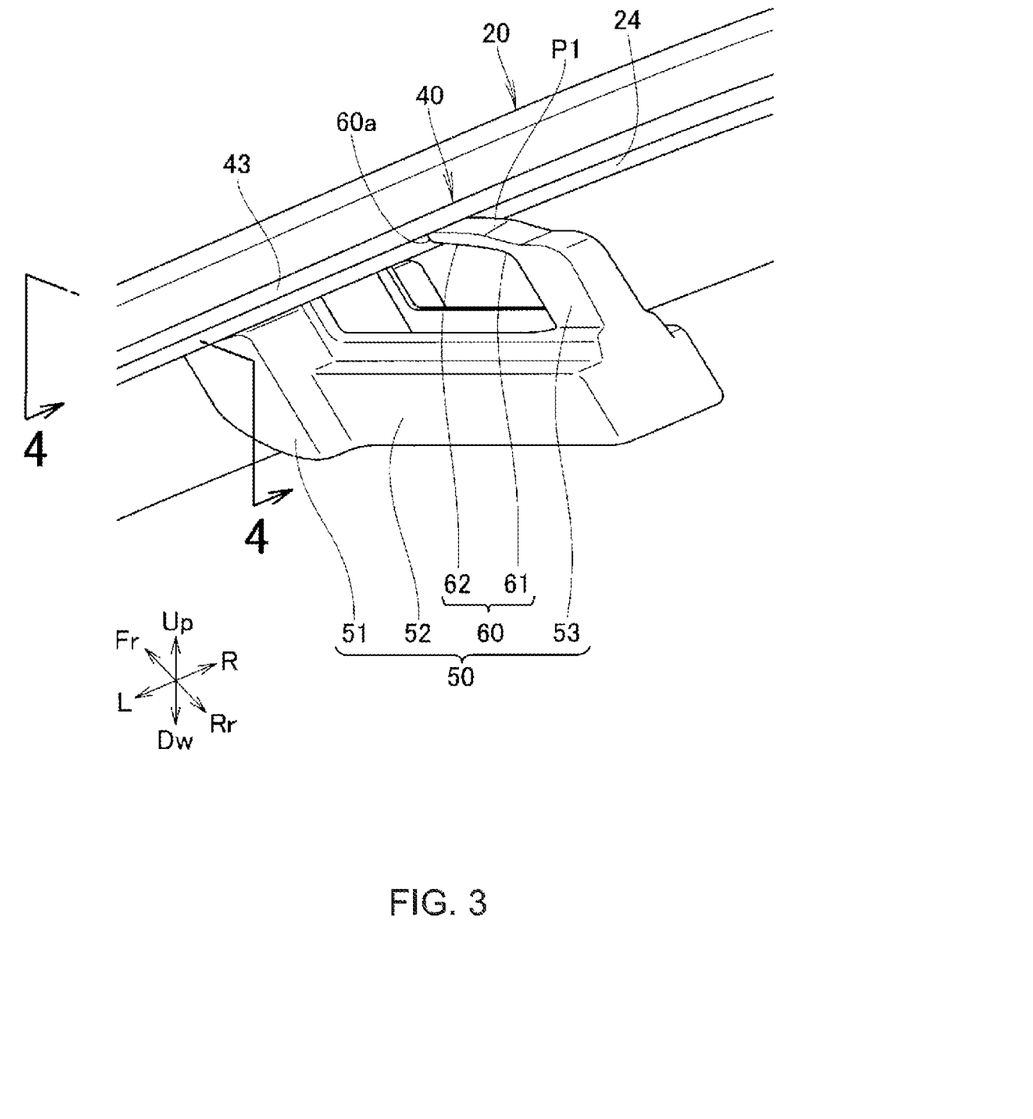
FIG. 3 is a perspective view of an inner glass contact portion shown in FIG. 1.
Figure 4:
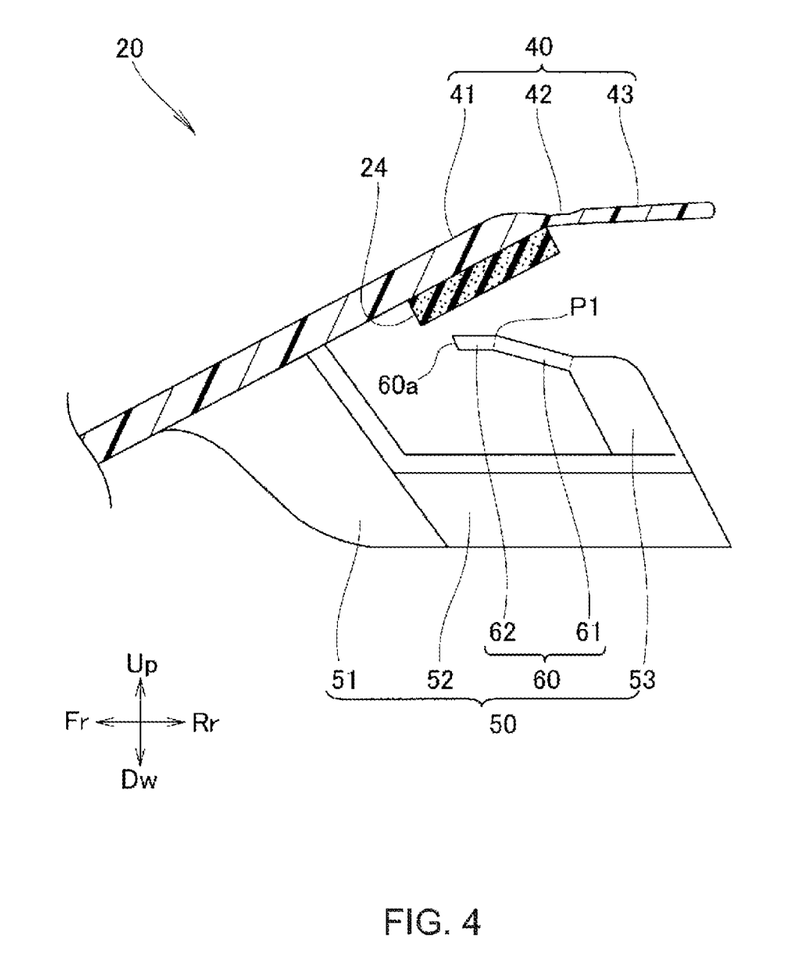

FIGS. 3 and 4 are referred to. The outer glass contact portion 40 is made up of a main body portion 41, a thin portion 42 that extends integrally from the main body portion 41 towards the rear and which is formed thin, and an outer contact piece 43 that extends integrally from the thin portion 42 towards the rear to be brought into contact with the windshield glass 14 (refer to FIG. 1). A sponge 24 is affixed to a lower portion of the main body portion 41 so as not only to suppress the intrusion of water but also to cushion the windshield glass 14.

The inner glass contact portions 50 are each made up of a base portion 51 that is formed so as to extend obliquely downwards and rearwards from a lower portion of the outer glass contact portion 40, a pillar portion 52 that extends to the rear from the base portion 51, a holding claw portion 53 that is formed so as to extend from an end portion of the pillar portion 52 towards the outer glass contact portion 40, and a lip 60 that is formed at a distal end of the holding claw portion 53.

The lip 60 has a bent shape (a substantially V shape) and is made up of a proximal-side first lip portion 61 and a distal-side second lip portion 62 with a bending point P1 of the bend shape as a boundary portion. The second lip portion 62 is formed so as to extend from the bending point P1 (the boundary portion) towards a distal end while approaching the outer glass contact portion 40 with respect to the first lip portion 61.

Here, FIG. 1 is also referred to. In a fabrication process of a cowl main body 20, in considering the ease with which a molded cowl main body 20 is removed from molds, there may be a case where a boundary of the molds coincides with a portion corresponding to a distal end 60a of a lip 60 and a parting line is formed on the distal end 60a of the lip 60 when the cowl main body 20 is removed from the molds. Since the parting line is thin, the parting line sets quickly, and the hardness of the parting line becomes high. Owing to this, there may be a case where the hardness of the distal end 60a of the lip 60 becomes higher than those of the other portions of the lip 60. Next, the pressing of the windshield glass 14 by the lip 60 will be described.

Figure 5:
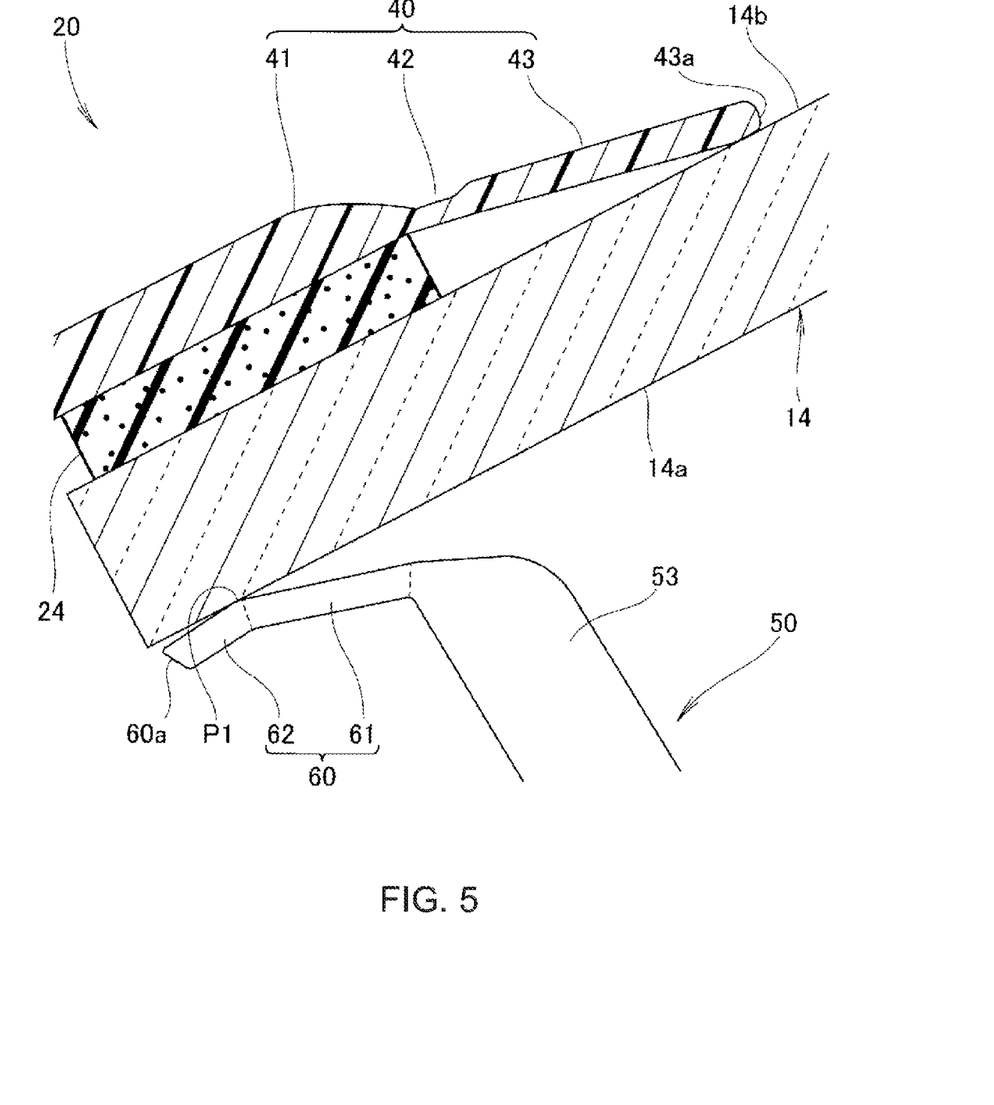
FIG. 5 is a functional diagram of the cowl structure shown in FIG. 1.

FIG. 5 is referred to. When the windshield glass 14 is inserted into the cowl main body 20, the lip 60 bends downwards from a proximal portion of the first lip portion 61 as a bending initiating point. An inner surface 14a of the windshield glass 14 is pressed by means of a repulsion produced by the lip 60 that has so bent. The windshield glass 14 that is pressed back by the lip 60 is brought into close contact with the sponge 24 provided between the windshield glass 14 and the outer glass contact portion 40.

Since the lip 60 has the bent shape as described above, the portion of the lip 60 that presses the windshield glass 14 is not the distal end 60a of the lip 60 but the bending point P1 that makes up the boundary portion between the first lip portion 61 and the second lip portion 62. Namely, the windshield glass 14 can be pressed by the portion that is softer than the distal end 60a by avoiding the distal end 60a of the lip 60 that has the highest hardness. Owing to this, there is no need to dispose a cushion material between the lip 60 and the front windshield glass 14. As a result, it is possible to prevent the increase in the number of parts involved.

In the extending direction of the lip 60, a length of the first lip portion 61 is longer than a length of the second lip portion 62. Namely, the length of the first lip portion 61 is longer than a half an overall length of the lip 60. Should the length of the first lip portion 61 be too short, almost no deformation is generated in the first lip portion 61, thereby making it difficult to insert the windshield glass 14 into the cowl main body 20. However, in case the specified length described above is ensured for the first lip portion 61, the first lip portion 61 is deformed greatly when the windshield glass 14 is inserted, thereby making it easy to insert the windshield glass 14 into the cowl main body 20. In addition, it is possible to obtain an appropriate repulsion after the windshield glass 14 has been inserted by ensuring the specified length described above.

Thus, as has been described heretofore, in case the length of the first lip portion 61 is longer than a half the overall length of the lip 60, the ease with which the windshield glass 14 is inserted can be compatible with the ensuring the holding force with which the windshield glass 14 is held by the lip 60.

A portion of the outer glass contact portion 40 is made thin. This enables the outer glass contact portion 40 to be bent easily from a thin portion 42 acting as a bending initiating point. An outer contact piece 43 that makes up a distal end of the outer glass contact portion 40 leans on an outer surface 14b of the windshield 14 by its own gravity. As a result, the following performance of the outer glass contact portion 40 along the windshield 14 is improved. This improves the degree of adhesion of the windshield glass 14 to the outer glass contact portion 40 and suppresses the generation of clearance or deformation therebetween, making it difficult for rain water to intrude therebetween. In addition, the improved degree of adhesion increases the integrity of the windshield glass 14 with the outer glass contact portion 40, thereby improving the design of the windshield.

The outer contact piece 43 is formed so that a portion connecting to the thin portion 42 is the thinnest and that the thickness increases continuously as it extends towards the distal end (the rear). In this case, the weight of a distal end 43a of the outer contact piece 43 becomes heavier than that of the thin portion 42. Owing to this, the following performance is further improved, thereby making it possible to prevent the intrusion of rain water accordingly.

<Embodiment 2>

Figure 6:
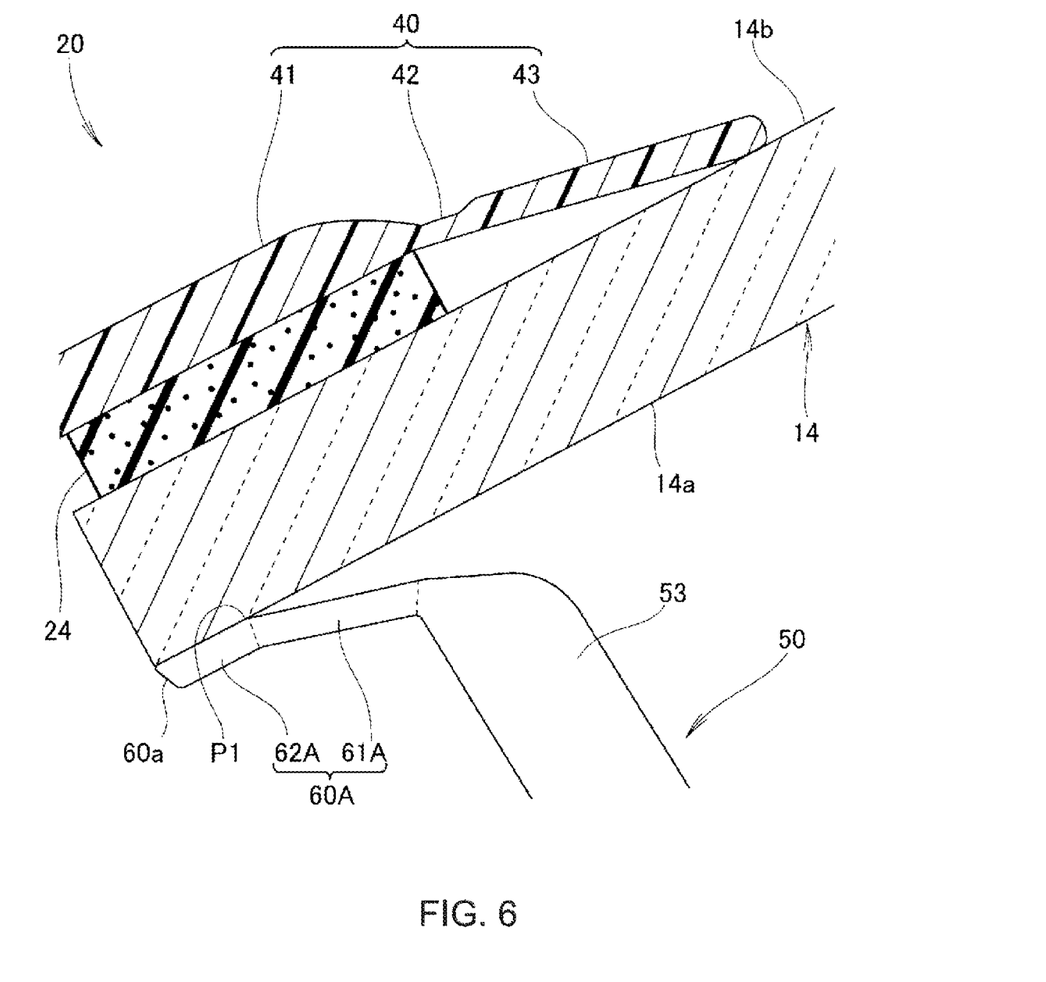
FIG. 6 is a functional diagram of a cowl construction according to Embodiment 2 of the invention.

Next, a lip 60A of Embodiment 2 will be described based on FIG. 6.

Depending upon a direction in which a first lip portion 61A extends from a proximal end towards a distal end thereof or a length set for the first lip portion 61A, there may also be a case where an overall surface of a second lip portion 62A (at least a portion of an upper surface of the second lip portion 62A) is brought into contact with a windshield glass 14 when the windshield Mass 14 is inserted between an outer glass contact portion 40 and the lip 60A.

As this occurs, although a distal end of the second lip portion 62A that has a high degree of hardness is also brought into contact with the windshield 14, not only the distal end but also the other portions of the second lip portion 62A are brought into contact with the windshield 14. Owing to this, compared with a case where the windshield glass 14 is pressed only by the distal end, the contact of the lip 60A with the windshield 14 becomes softer. Namely, the specified effect of the invention can be obtained by bringing not only the distal end 60a of the lip 60A that has the high degree of hardness but also the other portions into contact with the windshield 14 so as to increase the contact area of the lip 60A with the windshield glass 14.

<Embodiment 3>

Figure 7:
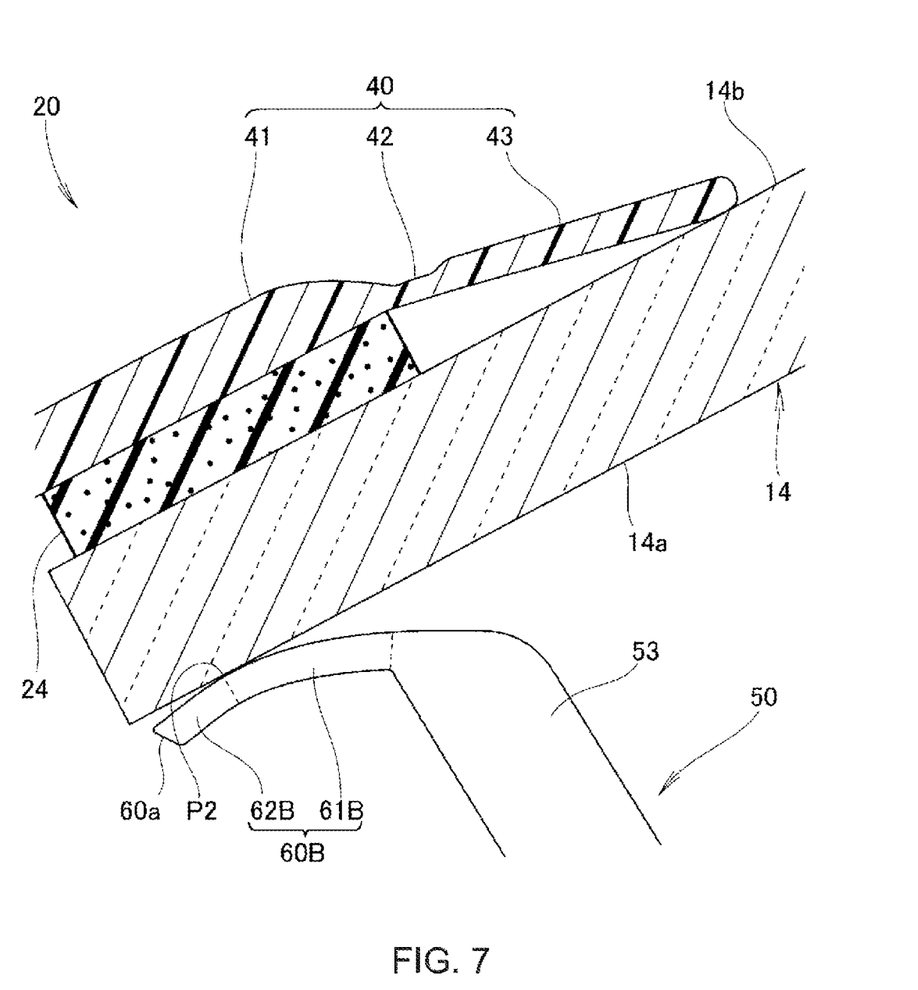
FIG. 7 is a functional diagram of a cowl construction according to Embodiment 3 of the invention.
Figure 8:
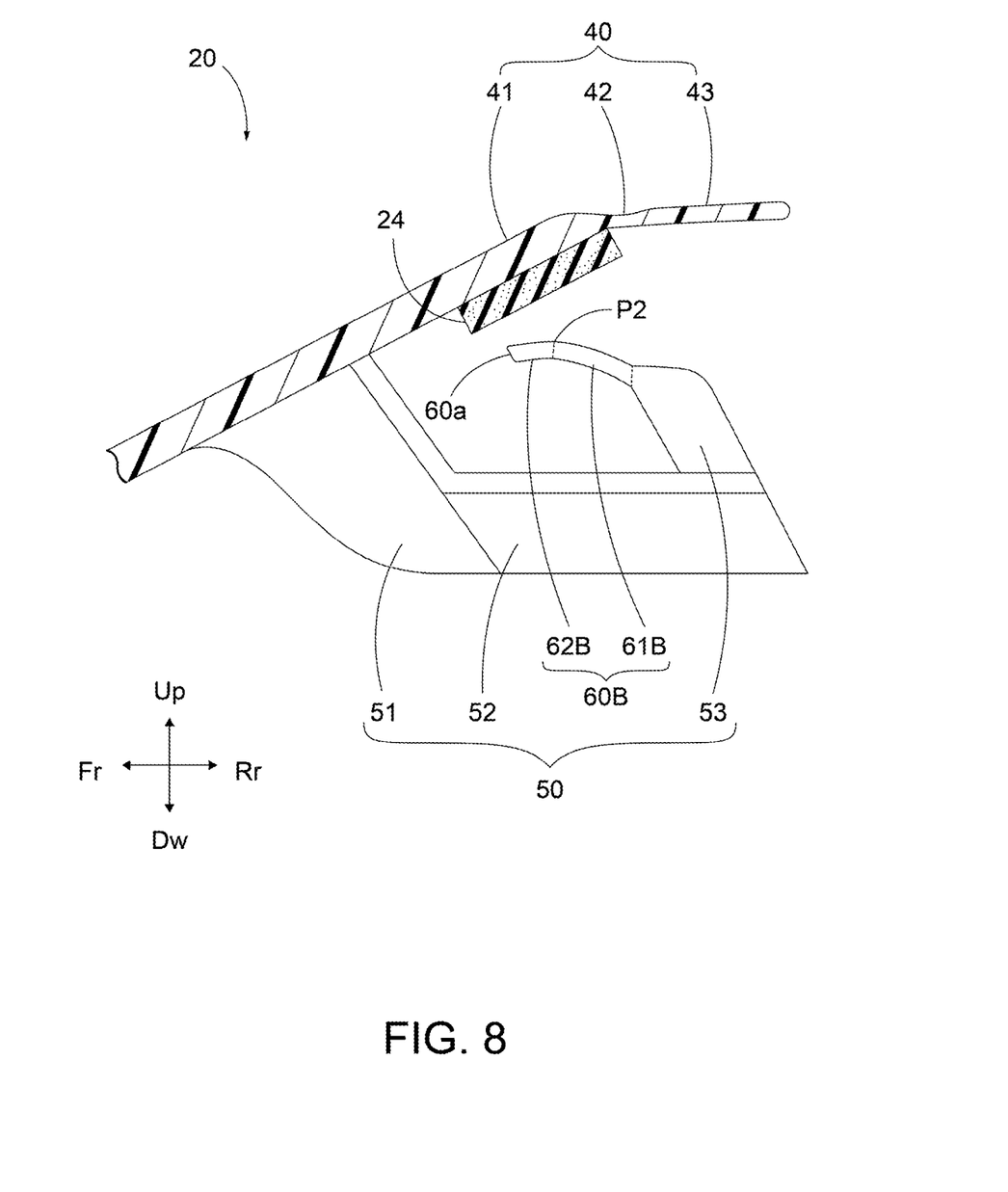
FIG. 8 is a sectional view taken along the same line as FIG. 3 and showing the cowl construction according to Embodiment 3 of the invention.

Next, a lip 60B of Embodiment 3 will be described based on FIGS. 7 and 8.

The lip 60B has an arc-like curved shape (a substantially U shape). As in the lip 60 of Embodiment 1, in the event that the bent shape is given to the lip portion 60, the angular portion is formed in the boundary between the first lip portion 61 and the second lip portion 62, and the windshield glass 14 is pressed by the angular portion. On the other hand, a first lip portion 61B and a second lip portion 62B of the lip 60B of this embodiment both have a curved shape. Owing to this, a windshield glass 14 is pressed by a curved surface about a curving point P2, and the pressing of the windshield glass 14 by the lip 60B becomes soft. In this case, too, it is possible to obtain the specified effect of the invention.

The outer glass contact portion 40 may be formed through two-color molding in which different materials are combined together for integral molding. In the event that the outer glass contact piece 43 is formed of a material that is softer than that of the main body portion 41, the adhesion of the outer glass contact piece 43 to the windshield glass 14 is enhanced.

INDUSTRIAL APPLICABILITY

The cowl structure of the invention is preferable for use for a passenger vehicle.

DESCRIPTION OF REFERENCE NUMERALS AND CHARACTERS

10: wheeled vehicle 12: dashboard panel 14: windshield 20: cowl main body 40: outer glass contact portion 42 thin portion 50: inner glass contact portion 60, 60A, 60B: lip 61, 61A, 61B: first lip portion 62, 62A, 62B: second lip portion Vi: passenger compartment P1: bending point (boundary portion) P2: curving point (boundary portion)

The invention claimed is:

1. A cowl structure comprising:
    a long cowl main body that is connected to an upper portion of a dashboard panel making up a front wall of a passenger compartment of a wheeled vehicle, and that is continuous with a lower end of a windshield glass,
    wherein the cowl main body has, at a rear edge thereof,
        an outer glass contact portion that is disposed parallel to an outer surface of the windshield glass, and that is brought into close contact with the windshield glass, and
        an inner glass contact portion that has a lip that presses an inner surface of the windshield glass,
    wherein the lip has a bent shape or a curved shape and is made up of a proximal-side first lip portion and a distal-side second lip portion with a bending point of the bent shape of the lip or a curving point of the curved shape of the lip as a boundary portion separating the first lip portion and the second lip portion,
    wherein the lip has the bent shape or the curved shape such that
        in a state where the windshield glass has not yet been inserted between the outer glass contact portion and the inner glass contact portion, the lip is postured such that a distal end of the lip is positioned closer to the outer glass contact portion than all other portions of the lip, and
        in a state where the windshield glass has been inserted between the outer glass contact portion and the inner glass contact portion, the lip is postured such that the boundary portion is positioned closer to the outer glass contact portion than all other portions of the lip, and
    wherein the second lip portion extends from the boundary portion towards the distal end of the lip while moving away from the windshield glass with respect to the first lip portion.

2. The cowl structure of claim 1,
    wherein, in the state where the windshield glass has been inserted between the outer glass contact portion and the inner glass contact portion, the second lip portion is spaced apart from the windshield glass.

3. The cowl structure of claim 1,
    wherein, in an extending direction of the lip, a length of the first lip portion is longer than a length of the second lip portion.

4. The cowl structure of claim 1,
    wherein a portion of the outer glass contact portion is made thin.

5. The cowl structure of claim 1, wherein the inner glass contact portion includes
    a base portion that extends obliquely downwards and rearwards from a lower portion of the outer glass contact portion,
    a pillar portion that extends rearwards from the base portion,
    a holding claw portion that extends from an end portion of the pillar portion towards the outer glass contact portion, and
    the lip that is formed at a distal end of the holding claw portion.

6. The cowl structure of claim 5, wherein
    the lip has the bent shape and is made up of the proximal-side first lip portion and the distal-side second lip portion with the bending point of the bent shape of the lip as the boundary portion separating the first lip portion and the second lip portion,
    the first lip portion is substantially linear and extends from the distal end of the holding claw portion, the boundary portion is disposed at a distal end of the first lip portion, and the second lip portion is substantially linear and extends from the boundary portion towards the distal end of the lip.

7. The cowl structure of claim 1, wherein the lip has the bent shape and is made up of the proximal-side first lip portion and the distal-side second lip portion with the bending point of the bent shape of the lip as the boundary portion separating the first lip portion and the second lip portion.

8. The cowl structure of claim 7, wherein the first lip portion is substantially linear, the second lip portion is substantially linear, and the first lip portion is provided at an angle defined by the bending point relative to the first lip portion.

* * * * *